United States Patent [19]

Arbogast

Best Available Copy

[11] E Re. 30,307

[45] Reissued Jun. 17, 1980

[54] CABLE TAKE UP LOAD BINDER

[76] Inventor: Vernon E. Arbogast, 1715 E. Front St., Coeur d'Alene, Id. 83814

[21] Appl. No.: 10,698

[22] Filed: Feb. 8, 1979

Related U.S. Patent Documents

Reissue of:

[64] Patent No.: 4,063,712
Issued: Dec. 20, 1977
Appl. No.: 708,315
Filed: Jun. 26, 1976

[51] Int. Cl.[2] ..... A63B 61/04

[52] U.S. Cl. ..... 410/37; 24/68 CD; 254/164

[58] Field of Search ..... 254/164, 163, 172, 186 HC, 254/161, 165; 105/477; 280/179 R, 179 A; 64/27 C, 27 CT, 15 C; 74/575, 577 R; 24/68 R–68 SC, 70 ST, 70 R, 269; 242/107.5, 107.4 R

[56] References Cited

U.S. PATENT DOCUMENTS

| | | | |
|---|---|---|---|
| 993,409 | 5/1911 | Roderick | 242/107.4 R |
| 1,209,917 | 12/1916 | Westinghouse | 64/27 CT |
| 1,401,739 | 12/1921 | Ryals | 254/164 |
| 1,662,223 | 3/1928 | Werner et al. | 64/27 CT |
| 1,987,316 | 1/1935 | Zimmer | 64/27 CT |
| 2,946,563 | 7/1960 | Eaton | 254/164 |
| 3,077,791 | 2/1963 | Gray | 254/164 |

*Primary Examiner*—John M. Jillions
*Attorney, Agent, or Firm*—Wells, St. John & Roberts

[57] ABSTRACT

A mechanism for tensioning a cable or chain over a load and for maintaining such tension even though the load may shift and settle. The mechanism includes a "U" shaped base that rotatably mounts an elongated cylindrical hollow spool. The spool is connected at opposite ends to a spaced pair of ratchet wheels. Pawls are located on the base member for operatively engaging each of the ratchet wheels. Inside the hollow spool is a torsion spring that is directly connected at one end to the spool. The remaining spring end is connected to one of the ratchet wheels. The spool and this particular ratchet wheel are relatively movable about the longitudinal spool axis since they are interconnected only through the torsion spring. The remaining ratchet wheel is affixed directly to the spool for rotation therewith. Turning the spool through this ratchet assembly does not wind the spring but instead serves only to wrap the cable or chain about the spool circumference. Once the desired tension has been applied to the cable or chain, the spring may be tightened by turning the other ratchet wheel. Thus, tensioning or winding of the spring may be accomplished as a function separate from the initial cable tightening function.

12 Claims, 5 Drawing Figures

CABLE TAKE UP LOAD BINDER

Matter enclosed in heavy brackets [ ] appears in the original patent but forms no part of this reissue specification; matter printed in italics indicates the additions made by reissue.

BACKGROUND OF THE INVENTION

The present device is related to the area of cable load binding apparatus and more particularly to such apparatus that is utilized to maintain a cable or chain in tension against a possibly shifting load.

Prior load binding or cable tightening apparatus are ordinarily constructed such that the winding spool is directly connected to a torsion spring which, in turn, is directly connected to a torsion source. Thus, to wind a cable or chain about the spool, winding force (torsion) must be transferred through the spring to the spool. When winding is accomplished through an interconnected spring and spool, the spring becomes completely wound before torque is applied directly from the source to the spool. It is undesirable to apply excessive winding force to a spring that has already been wound to its limit. Thus, it is not prudent to wind the tightening element (cable) any tigher than the equivalent capacity of the torsion spring. This is an undesirable characteristic of prior load binding appratus.

U.S. Pat. No. 3,077,791 granted to R. H. Gray on Feb. 19, 1963, discloses a pawl and ratchet mechanism for a load binding winch. This patent shows the use of the center shaft rotatably carried within a hollow spool. A spring interconnects the shaft and the spool. A ratchet wheel is interposed between the shaft and spring so when the shaft is rotated, the spring is tightened against resistance offered by the spool. Thus, the torque applied by the center shaft is transferred indirectly to the spool through the torsion spring.

U.S. Pat. No. 2,991,975 granted to M. Alexander on July 11, 1961, also discloses a load binder. Like the Gray apparatus, the Alexander binder includes a central rotatable shaft that is housed within a hollow spool and is connected to the spool through a ratchet and torsion spring. Torque is applied to the spool through the spring and interconnected central shaft.

SUMMARY OF THE INVENTION

A cable take up load binder assembly is described that includes a "U" shaped base having two upstanding spaced ears. A hollow winding spool is rotatably mounted between the ears and includes a first ratchet wheel that is affixed at one end thereof. The ratchet wheel is located adjacent one of the upstanding ears. A first pawl operatively engages the first ratchet wheel and is pivotally mounted to the adjacent ear. A second ratchet wheel is rotatably mounted to the remaining ear and rotatably journals the remaining end of the spool. The second pawl operatively engages the second ratchet wheel and is pivotally mounted to the remaining ear. A torsion spring is received within the hollow interior of the spool and is affixed at one end to a first plate. This first plate spans the hollow interior of the spool at the end adjacent the first ratchet wheel. The remaining end of the torsion spring is connected to a second plate that is, in turn, affixed to the second ratchet wheel. Means is also provided for on both the first and second ratchet wheels for receiving a turning element. This element is utilized for transferring torque directly or indirectly to the spool.

A primary object of the present invention is to provide a cable take up mechanism whereby a constant tension may be applied to a load binding cable even though the load may shift to different configuration.

Another object is to provide such a device whereby the cable or chain may be initially tensioned through direct turning force applied to the take up spool and wherein the cable tension may be maintained through an independent spring and ratchet wheel arrangement that may be tightened to any desired degree against resistance of the previously tightened cable.

A still further object is to provide such an arrangement that is simple in construction and easy to operate.

These and still further objects and advantages will become apparent upon reading the following detailed description which, taken with the accompanying drawings, describe a preferred form of my invention. It should be noted however that the description and drawings are given only by way of example to set forth a preferred form of the invention and are not intended to place specific restrictions thereon. Only the claims found at the end of this application are to be taken as definitions of what I consider to be my invention.

DETAILED DESCRIPTION OF A PREFERRED EMBODIMENT

Figure 1:
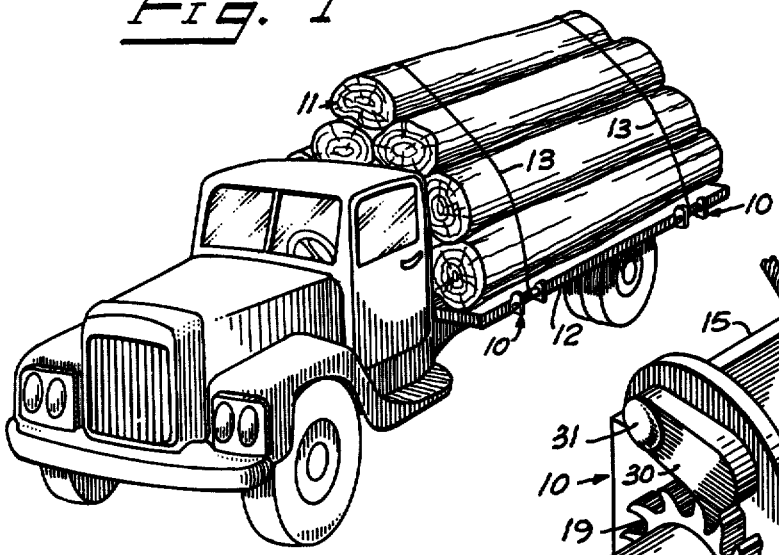
FIG. 1 is a diagrammatic view of a truck utilizing the present load binding assembly.
Figure 2:
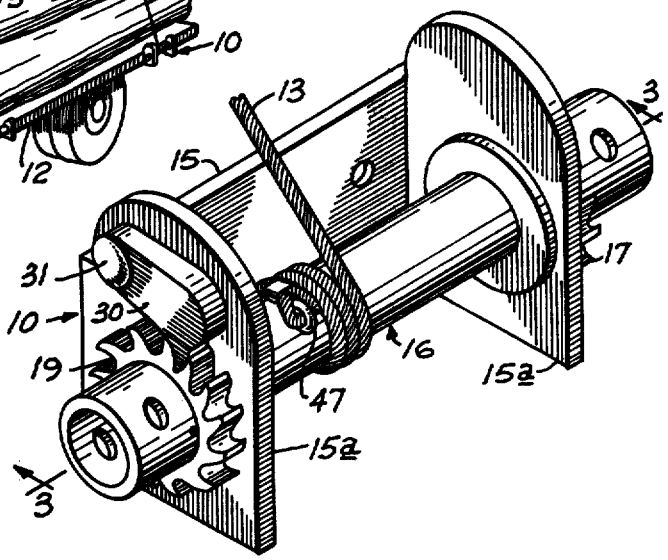
FIG. 2 is a pictorial view of the present assembly.

A preferred form of the preferred invention is illustrated in the accompanying drawings and is indicated by the reference character 10. The present load binder assembly 10 is utilized to pull a cable or chain to a taut condition about a load 11 carried on a truck bed 12. Ordinarily a cable 13 is utilized rather than a chain and, for the purposes of this disclosure, a cable may be broadly defined as any non-extensible, flexible element that is capable of being wrapped about a relatively small diameter spool.

Figure 3:
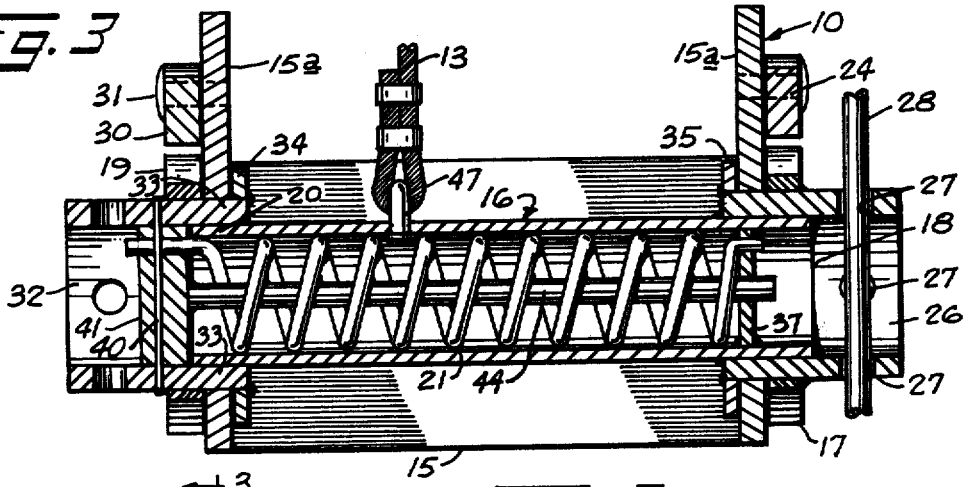
FIG. 3 is a sectional view taken along line 3—3 in FIG. 2.
Figure 4:
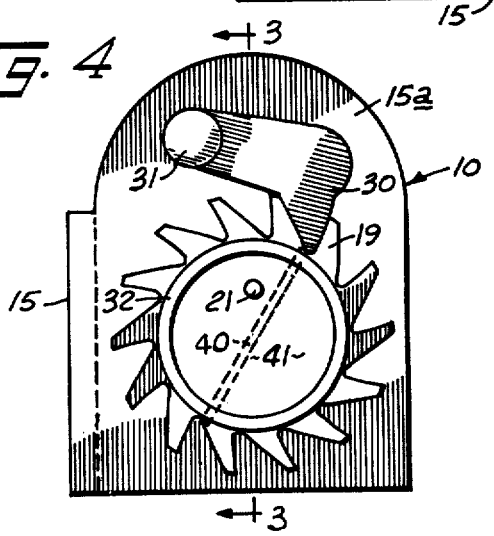
FIG. 4 is an elevational end view of the apparatus.
Figure 5:
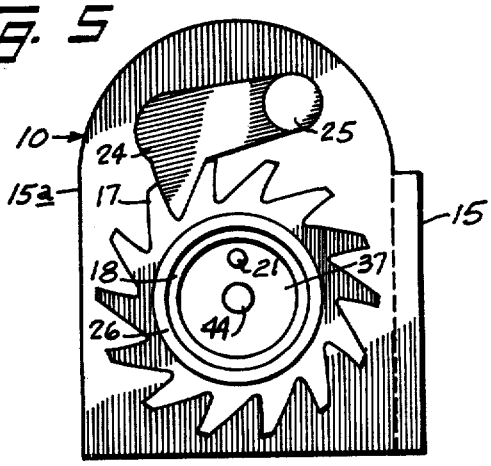
FIG. 5 is an elevational end view of the opposite end.

The present assembly is shown in particular detail in FIGS. 2 through 5. The assembly is shown comprising the "U" shaped base 15 that rotatably mounts an elongated spool 16. The spool is mounted between upright ears 15a of base 15. A first ratchet wheel 17 is fixed to an end 18 of spool 16 to directly transmit torque to the spool 16. Ratchet wheel 17 is located adjacent and outwardly facing surface of one of the ears 15a. A second ratchet wheel 19 is indirectly mounted to a remaining spool end 20. The wheel 19 and spool 16 are independently rotatable about coaxial axes. Second ratchet wheel 19 is connected to spool 16 through an elongated torsion spring 21 (FIG. 3).

The first ratchet wheel 17 is operatively connected to base 15 through a pawl 24. Pawl 24 is pivoted to an adjacent ear 15a at 25. The ratchet wheel 17 also includes an outwardly projecting first hub 26 having angularly spaced holes 27 therein for releasably receiving a turning member 28 whereby an operator may apply direct turning force to the wheel 17 and spool 16 affixed thereto.

The second ratchet wheel 19 is operatively connected to the base 15 through a second pawl 30. Pawl 30 is mounted to an upstanding ear 15a at a pivot 31. Ratchet wheel 19 further includes an outwardly projecting second hub 32 that is adapted, as is first hub 26, to receive a turning member such as the rod shown at 28.

The second ratchet wheel 19 is affixed to a cylindrical sleeve 33. Sleeve 33 is rotatably received within a complementary aperture through the associated ear 15a. An inner end of sleeve 33 rotatably receives the end 20 of spool 16. It is important to note that the spool and sleeve are not fixed together and will rotate relative to one another about coaxial axes. The only direct connection between ratchet wheel 19 and spool 16 is through the torsion spring 21.

A flange 34 is affixed to an inside end of sleeve 33 to sandwich the associated ear 15a between the flange and adjacent ratchet wheel 19. This provision prevents axial movement of the ratchet wheel relative to the base 15. Similarly, a flange 35 is provided at the opposite end 18 of the spool 16 and is affixed thereto to sandwich the remaining ear 15a between it and the first ratchet wheel 17. This provision assures that the spool 16 will not move axially relative to the base 15. It may now be understood that the spool 16 is free to rotate about its central spool axis but is incapable of longitudinal movement with sleeve 33.

The spring 21 is connected at one end to a plate 37. Plate 37 is affixed to spool 16 adjacent its end 18. The plate 37 includes an appropriate aperture through which the spring end is received. The aperture holds the spring end at a location offset from the longitudinal spring axis (which is coaxial with the longitudinal axis of spool 16).

A second plate 41 is affixed to sleeve 33 by a roll pin 40. The plate 41 projects across the opening of spool 16 to receive the remaining end of spring 21. The spring end extends through plate 41 at a position thereon radially spaced from the spool axis.

An elongated shaft 44 is integral with the plate 41 and extends through the spool 16 and protrudes loosely through plate 37. It serves as a wrapping member for spring 21 and prevents binding of the spring 21 when in a wound condition.

In operation, a cable 13 is connected through a cable eyelet 47 to the spool 16. The remaining end of the cable is fastened to the platform to which the "U" shaped base 15 is attached. The load 11 is located between cable 13 and the platform.

The first step in the cable tightening procedure then is to directly tighten the cable against the load by turning the spool from the first ratchet wheel 17. As the ratchet wheel turns, the pawl 24 alternately engages and disengages successive ratchet teeth, allowing rotation of the spool in one direction but preventing unwinding movement of the spool in the [oppostie] *opposite* direction. Torque is directly transmitted from the first ratchet wheel 17 to spool 16 since they are directly connected to one another.

The second ratchet wheel also rotates as the spool rotates. The rotation of spool 16 is transmitted through spring 21 to plate 41 and, subsequently to the second ratchet wheel. Since there is no resistance offered by ratchet wheel 19 to such rotation, the spring 21 will not become wound tight but will simply transfer movement from the rotating plate 37 to plate 41.

The ratchet wheel 17 is turned until cable 13 becomes sufficiently taut against the load 11. At this time, the lever [27] *28* is removed from hub 26 and inserted in the aperture of the second hub 32. Tightening of spring 21 occurs as the hub and second ratchet wheel 19 are rotated as if to further tighten cable 13. Such rotation serves to wind the spring against resistance offered by taut cable 13. Pawl 30 allows tightening of spring 21. Pawl 24 will not allow the spring to unwind through the ratchet wheel 19. Instead, if the spring is allowed to unwind, it must also turn the spool 16 and thereby take up additional cable 13. Therefore, should the load 11 shift and loosen the cable 13, the slack amount will be automatically taken up through action of the coiled spring.

It should be noted that the spring may be selectively tightened to any desired degree after the cable has been previously tensioned through operation of the first ratchet wheel. Indeed, there could arise occasions when there would be no necessity for tightening the spring against the cable. In this instance only the first ratchet 17 and associated hub 26 would be utilized to tighten the cable against the load.

It may also be easily understood that there is no necessity for applying turning force to the spring in excess of the amount required to fully wind the spring.

It may have become obvious from the above description and detailed drawings that various changes and modifications may be made therein without departing from the intended scope of my invention. Therefore, only the following claims are to be taken as definitions of my invention.

What I claim is:

1. A cable take up load binder, comprising:

a "U" shaped base having two upstanding spaced ears;

a hollow winding spool rotatably mounted between the ears;

a first ratchet wheel affixed to the spool at one end thereof adjacent one of the ears;

a first pawl operatively engaging the first ratchet wheel and pivotably mounted to the one ear;

a second ratchet wheel rotatably mounted to the remaining ear and rotatably journaling the remaining end of the spool;

a second pawl operatively engaging the second ratchet wheel and pivotably mounted to the remaining ear;

a first plate affixed to the spool at the one end;

a torsion spring received coaxially within the spool and having one end thereof connected to the first plate;

a second plate affixed to the second ratchet wheel and receiving the remaining end of the spring;

first hub means on the first ratchet wheel for receiving a turning element for applying direct torsional force to the spool; and second hub means on the second ratchet wheel for receiving a turning element for selectively applying torsional spring force against the spool independent of the forces applied through the first hub means.

2. The load binder as set out by claim 1 wherein the torsion spring is an expanded coil spring and an elongated shaft extends through the length of the spring and is [rotatably] mounted at opposite ends to the first and second plates.

3. The load binder as set out by claim 1 wherein the first and second ratchet wheels are located adjacent outwardly facing surfaces of the ears and wherein the spool includes [flanges] *a flange* adjacent *an* inwardly facing [surfaces] *surface* of [the ears] *one ear.*

4. The load binder as set out by claim 1 further comprising means on the spool for attaching the free end of [the] *a* load binder cable or chain.

5. The load binder as set out by claim 1 wherein the first and second ratchet wheels are located adjacent outwardly facing surfaces of the ears and wherein a first flange is mounted to the spool adjacent an inward facing surface of the one ear and *a* second flange is operatively mounted to the second ratchet wheel and is located adjacent an inwardly facing surface of the remaining ear and freely rotatably receives the remaining end of the spool.

6. The load binder as set out by claim 5 wherein the second ratchet wheel and second flange are interconnected by a cylindrical sleeve [carried for free rotation about its central axis] *mounted* within an aperture in the remaining ear *for free rotation about its central axis;* wherein the second plate is affixed to the sleeve; and wherein the sleeve receives the remaining end of the spool for free coaxial rotation therein.

7. The load binder as set out by claim 1 wherein the torsion spring is an expanded coil spring and an elongated shaft extends through the length of the spring and is [rotatably] mounted at opposite ends to the first and second plates.

8. A cable take up load binder, comprising:

a "U" shaped base having two upstanding spaced ears;

a hollow winding spool rotatably mounted between the ears;

a first ratchet wheel affixed to the spool at one end thereof adjacent one of the ears;

a first pawl operatively engaging the first ratchet wheel and pivotably mounted to the one ear;

a second ratchet wheel rotatably mounted to the remaining ear and rotatably journaling the remaining end of the spool;

a second pawl operatively engaging the second ratchet wheel and pivotably mounted to the remaining ear;

a first plate affixed to the spool spanning the hollow interior thereof at the one spool end;

a torsion spring received coaxially within the spool and having one end thereof connected to the first plate;

a second plate affixed to the second ratchet wheel and receiving the remaining end of the spring;

means on the first and second ratchet wheels for receiving a turning element; and wherein the first and second ratchet wheels are located adjacent outwardly facing surfaces of the ears and wherein the spool includes [flanges] *a flange* adjacent *an* inwardly facing [surfaces] *surface* of [the ears] *one ear.*

9. The load binder as set out by claim 8 further comprising means on the spool for attaching the free end of [the] *a* load binder cable or chain.

10. The load binder as set out by claim 8 wherein the first and second ratchet wheels are located outwardly facing surfaces of the ears and wherein a first flange is mounted to the spool adjacent an inward facing surface of the one ear and *a* second flange is operatively mounted to the second ratchet wheel and is located adjacent an inwardly facing surface of the remaining ear and freely rotatably receives the remaining end of the spool.

11. The load binder as set out by claim 10 wherein the second ratchet wheel and second flange are interconnected by a cylindrical sleeve [carried for free rotation about its central axis] *mounted* within an aperture in the remaining ear *for free rotation about its central axis;* wherein the second plate is affixed to the sleeve; and wherein the sleeve receives the remaining end of the spool for free coaxial rotation therein.

*12. A cable take up load binder, comprising:*

*a base;*

*a hollow winding spool rotatably mounted to the base;*

*a first ratchet wheel affixed to the spool;*

*a first pawl operatively engaging the first ratchet wheel and pivotably mounted to the base;*

*a second ratchet wheel rotatably mounted to the base and rotatably journaling the remaining end of the spool;*

*a second pawl operatively engaging the second ratchet wheel and pivotably mounted to the base;*

*a torsion spring received coaxially within the spool and having one end thereof operatively connected to the spool and a remaining end operatively connected to the second ratchet wheel;*

*first hub means on the first ratchet wheel for receiving a turning element for applying direct torsional force to the spool; and*

*second hub means on the second ratchet wheel for receiving a turning element for selectively applying torsional spring force against the spool independent of the forces applied through the first hub means.*

* * * * *